United States Patent
Videtich et al.

(10) Patent No.: US 8,571,752 B2
(45) Date of Patent: Oct. 29, 2013

(54) VEHICLE MIRROR AND TELEMATICS SYSTEM

(75) Inventors: Matt C. Videtich, Farmington Hills, MI (US); John J. Correia, Livonia, MI (US); Jeffrey P. Christensen, Clinton Township, MI (US); Michael D. Solomon, Novi, MI (US); Daryl L. Carr, Canton, MI (US)

(73) Assignee: General Motors LLC, Detroit, MI (US)

( * ) Notice: Subject to any disclaimer, the term of this patent is extended or adjusted under 35 U.S.C. 154(b) by 348 days.

(21) Appl. No.: 12/851,025

(22) Filed: Aug. 5, 2010

(65) Prior Publication Data

US 2012/0041640 A1 Feb. 16, 2012

(51) Int. Cl.
*H04B 1/38* (2006.01)

(52) U.S. Cl.
USPC ............................ 701/33; 455/558; 701/500

(58) Field of Classification Search
USPC .................................... 701/33, 500; 455/558
See application file for complete search history.

(56) References Cited

U.S. PATENT DOCUMENTS

| | | | |
|---|---|---|---|
| 4,882,565 A | 11/1989 | Gallmeyer | |
| 5,798,688 A | 8/1998 | Schofield | |
| 6,019,475 A | 2/2000 | Lynam et al. | |
| 6,087,953 A | 7/2000 | DeLine et al. | |
| 6,172,613 B1 | 1/2001 | DeLine et al. | |
| 6,329,925 B1 | 12/2001 | Skiver et al. | |
| 6,366,213 B2 | 4/2002 | DeLine et al. | |
| 6,428,172 B1 | 8/2002 | Hutzel et al. | |
| 6,501,387 B2 | 12/2002 | Skiver et al. | |
| 6,505,100 B1 | 1/2003 | Stuempfle et al. | |
| 6,520,667 B1 | 2/2003 | Mousseau | |
| 6,549,793 B1 | 4/2003 | Baratono | |
| 6,633,647 B1 | 10/2003 | Markow et al. | |
| 6,654,669 B2 | 11/2003 | Eisenmann et al. | |
| 6,690,268 B2 | 2/2004 | Schofield et al. | |
| 6,756,912 B2 | 6/2004 | Skiver et al. | |
| 6,889,064 B2 | 5/2005 | Baratono et al. | |
| 6,902,284 B2 | 6/2005 | Hutzel et al. | |
| 6,906,632 B2 | 6/2005 | DeLine et al. | |
| 6,993,351 B2 | 1/2006 | Fraser et al. | |
| 7,012,727 B2 | 3/2006 | Hutzel et al. | |
| 7,075,511 B1 | 7/2006 | Mousseau et al. | |
| 7,142,810 B2 | 11/2006 | Oesterling | |

(Continued)

OTHER PUBLICATIONS

Oesterling, C. L., et al. "Aftermarket Telematics Unit for Use Wth a Vehicle," U.S. Appl. No. 12/845,848, filed Jul. 29, 2010.

(Continued)

*Primary Examiner* — Mary Cheung
*Assistant Examiner* — Yuen Wong
(74) *Attorney, Agent, or Firm* — Ingrassia Fisher & Lorenz, P.C.

(57) ABSTRACT

Vehicle mirrors and telematics systems are provided. A vehicle mirror comprises a mirror housing and an accelerometer. The mirror housing is configured to be mounted within a vehicle. The accelerometer is disposed within the mirror housing, and is configured to measure an acceleration of the vehicle. A diagnostics device is configured to provide diagnostics information pertaining to the vehicle. A navigation device is configured to provide navigation information as to a position of the vehicle. A controller is coupled to the accelerometer, the diagnostics device, and the navigation device. The controller is configured to generate vehicle determinations using the acceleration, the diagnostics information, and the navigation information. A transmitter is coupled to the controller, and is configured to transmit determination information pertaining to the vehicle determinations.

17 Claims, 6 Drawing Sheets

(56) References Cited

U.S. PATENT DOCUMENTS

| | | |
|---|---|---|
| 7,171,187 B2 | 1/2007 | Haave et al. |
| 7,171,226 B2 | 1/2007 | Crocker et al. |
| 7,257,426 B1 | 8/2007 | Witkowski et al. |
| 7,293,888 B2 | 11/2007 | Hutzel et al. |
| 7,299,076 B2 | 11/2007 | Dunn, Jr. et al. |
| 7,308,341 B2 | 12/2007 | Schofield et al. |
| 7,346,374 B2 | 3/2008 | Witkowski et al. |
| 7,349,722 B2 | 3/2008 | Witkowski et al. |
| 7,372,818 B2 | 5/2008 | Fraser et al. |
| 7,395,096 B2 | 7/2008 | Baratono et al. |
| 7,474,942 B2 | 1/2009 | Patenaude |
| 7,488,080 B2 | 2/2009 | Skiver et al. |
| 7,526,367 B2 | 4/2009 | Schofield et al. |
| 7,651,228 B2 | 1/2010 | Skiver et al. |
| 7,657,052 B2 | 2/2010 | Larson et al. |
| 7,690,824 B2 | 4/2010 | Uken et al. |
| 7,711,479 B2 | 5/2010 | Taylor et al. |
| 7,734,392 B2 | 6/2010 | Schofield et al. |
| 7,904,023 B2 | 3/2011 | Viitamäki et al. |
| 7,970,446 B2 | 6/2011 | Witkowski et al. |
| 8,194,133 B2 | 6/2012 | Dewind et al. |
| 2002/0197955 A1 | 12/2002 | Witkowski et al. |
| 2003/0001734 A1 | 1/2003 | Schofield et al. |
| 2003/0020603 A1 | 1/2003 | DeLine et al. |
| 2003/0102688 A1 | 6/2003 | Bingle et al. |
| 2003/0117728 A1 | 6/2003 | Hutzel et al. |
| 2003/0191583 A1 | 10/2003 | Uhlmann et al. |
| 2004/0145457 A1 | 7/2004 | Schofield et al. |
| 2004/0160313 A1 | 8/2004 | McCarthy et al. |
| 2004/0165293 A1 | 8/2004 | Whitehead |
| 2004/0203379 A1 | 10/2004 | Witkowski et al. |
| 2004/0209655 A1 | 10/2004 | Kubo |
| 2005/0023858 A1 | 2/2005 | Bingle et al. |
| 2005/0032550 A1* | 2/2005 | Baratono et al. ............... 455/558 |
| 2005/0040941 A1 | 2/2005 | Schofield et al. |
| 2005/0156714 A1 | 7/2005 | McCarthy et al. |
| 2005/0156753 A1 | 7/2005 | DeLine et al. |
| 2006/0035590 A1 | 2/2006 | Morris et al. |
| 2006/0220817 A1 | 10/2006 | Schofield et al. |
| 2006/0261932 A1 | 11/2006 | Ando et al. |
| 2006/0290518 A1 | 12/2006 | Bingle et al. |
| 2007/0002477 A1 | 1/2007 | Whitehead |
| 2007/0047753 A1 | 3/2007 | Watson et al. |
| 2007/0058821 A1 | 3/2007 | Welsh et al. |
| 2007/0109807 A1 | 5/2007 | Lynam et al. |
| 2007/0118280 A1 | 5/2007 | Uhlmann et al. |
| 2007/0132567 A1 | 6/2007 | Schofield et al. |
| 2007/0171037 A1 | 7/2007 | Schofield et al. |
| 2008/0045274 A1 | 2/2008 | Witkowski et al. |
| 2008/0080076 A1* | 4/2008 | Hutzel et al. ............... 359/871 |
| 2008/0137895 A1 | 6/2008 | Gratke et al. |
| 2008/0174414 A1 | 7/2008 | McCarthy et al. |
| 2008/0186724 A1 | 8/2008 | Lynam et al. |
| 2008/0212215 A1 | 9/2008 | Schofield et al. |
| 2008/0225538 A1 | 9/2008 | Lynam et al. |
| 2008/0266389 A1 | 10/2008 | DeWind et al. |
| 2008/0300779 A1 | 12/2008 | Uhlmann et al. |
| 2009/0005136 A1 | 1/2009 | Hutzel et al. |
| 2009/0097674 A1 | 4/2009 | Watson et al. |
| 2009/0134606 A1 | 5/2009 | Schofield et al. |
| 2009/0208058 A1 | 8/2009 | Schofield et al. |
| 2009/0232328 A1 | 9/2009 | DeLine et al. |
| 2009/0284391 A1* | 11/2009 | Berkobin et al. ........ 340/870.01 |
| 2009/0290369 A1 | 11/2009 | Schofield et al. |
| 2009/0318084 A1 | 12/2009 | McCarthy et al. |
| 2010/0045790 A1 | 2/2010 | Lynam et al. |
| 2010/0045797 A1 | 2/2010 | Schofield et al. |
| 2010/0188508 A1 | 7/2010 | McMahon et al. |
| 2011/0227698 A1 | 9/2011 | Witkowski et al. |
| 2012/0005395 A1 | 1/2012 | Lydon et al. |
| 2012/0236152 A1 | 9/2012 | Dewind et al. |

OTHER PUBLICATIONS

USPTO, U.S. "Non-Final Office Action" mailed May 4, 2012 for U.S. Appl. No. 12/845,822, filed Jul. 29, 2010.

Owens, K.W., et al. "Telematics Unit and Method for Controlling Telematics Unit for a Vehicle," U.S. Appl. No. 12/845,822, filed Jul. 29, 2010.7.

Owens, K.W., et al. "Aftermarket Telematics System," U.S. Appl. No. 12/895,066, filed Sep. 30, 2010.

Peariso, N.J., et al. "Aftermarket Telematics Unit and Method for Installation Verification," U.S. Appl. No. 12/899,808, filed Oct. 7, 2010.

USPTO, U.S. Non-Final Office Action mailed Jan. 18, 2013 for U.S. Appl. No. 12/895,066, filed Sep. 30, 2010.

USPTO, U.S. "Notice of Allowance" mailed Sep. 19, 2012 for U.S. Appl. No. 12/845,822, filed Jul. 29, 2010.

USPTO, U.S. "Non-Final Office Action" mailed Nov. 28, 2012 for U.S. Appl. No. 12/845,848, filed Jul. 29, 2010.

German Patent & Trademark Office. German Office Action dated Nov. 20, 2012 for Application No. 10 2011 106 073.5.

USPTO, Non-Final Office Action for U.S. Appl. No. 12/830,928, mailed Mar. 15, 2013.

USPTO, Notice of Allowance and Fee(s) Due for U.S. Appl. No. 12/845,848, mailed Mar. 28, 2013.

USPTO, Notice of Allowance and Fee(s) Due for U.S. Appl. No. 12/895,066, mailed May 31, 2013.

USPTO, Notice of Allowance and Fee(s) Due for U.S. Appl. No. 12/899,808, mailed Feb. 14, 2013.

* cited by examiner

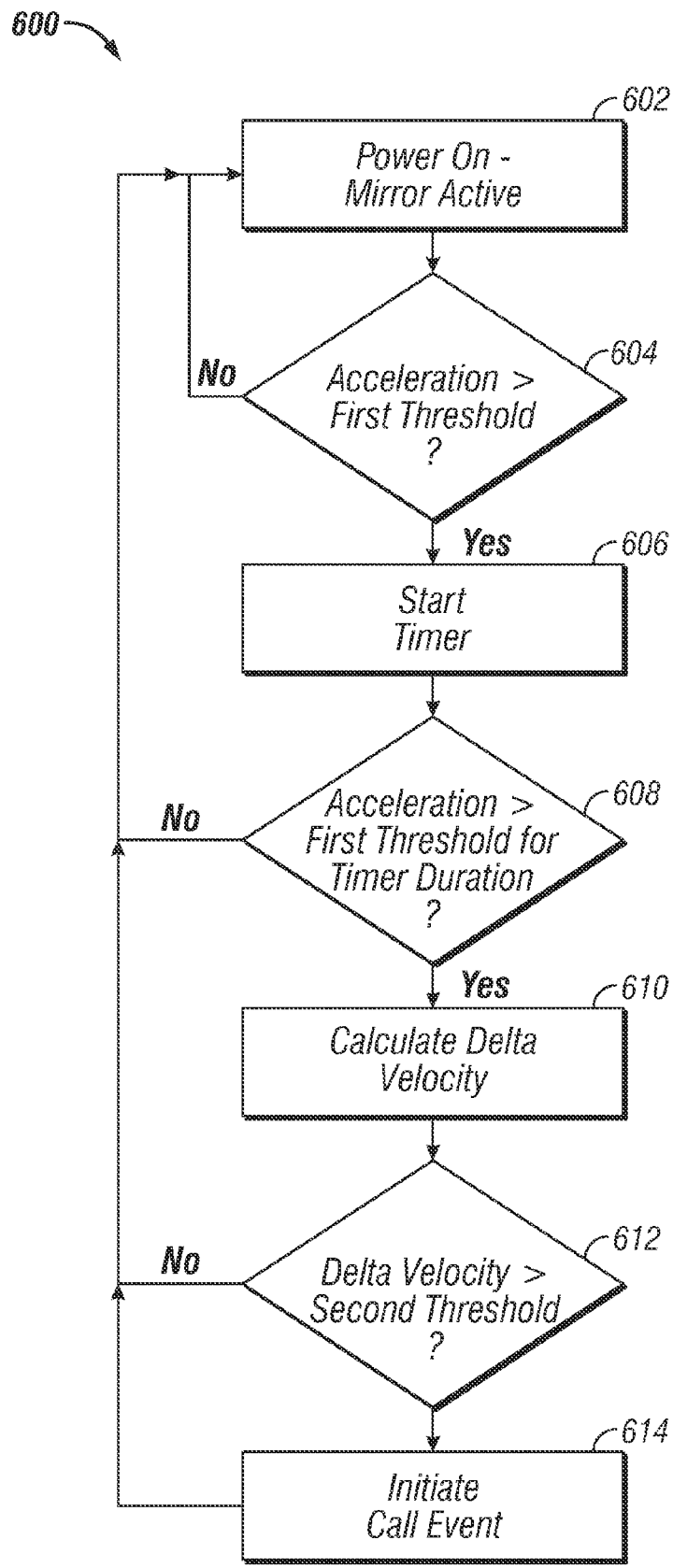

VEHICLE MIRROR AND TELEMATICS SYSTEM

TECHNICAL FIELD

The technical field generally relates to vehicles, and, more particularly, to mirrors and telematics systems for vehicles.

BACKGROUND

Many vehicles in the marketplace are equipped with telematics units. Certain telematics units are designed, constructed, and programmed to enable a user of the vehicle (hereinafter "user") to interact with a communications network. The communication network includes a remotely located call center (hereinafter "call center") staffed with live advisors (hereinafter "advisors") who are trained to provide assistance to the user. Through the communication network, a user may utilize a wide variety of telematics services that are designed to facilitate and/or enhance the user's driving and/or vehicle ownership experience. Such services may include, but are not limited to, navigation assistance, vehicle monitoring, and telecommunication services. These telematics services may be provided by a manufacturer of the vehicle, by a manufacturer of the telematics units, or by some other telematics service provider.

In many vehicles, telematics units are factory installed inside the vehicle during manufacturing of the vehicle. However, it may also be desirable to provide movable telematics units and/or components thereof, for example for vehicles that do not have a factory installed telematics unit or so that the telematics unit may be transferred from vehicle to vehicle, for example when the user purchases a new vehicle.

Accordingly, it is desirable to provide an improved telematics systems and/or components thereof, for example that are movable, for example for vehicles that do not have a factory installed telematics unit and/or so that the telematics unit may be transferred from vehicle to vehicle. Furthermore, other desirable features and characteristics of the present invention will become apparent from the subsequent detailed description and the appended claims, taken in conjunction with the accompanying drawings and the foregoing technical field and background.

SUMMARY

In accordance with one example, a mirror is provided. The mirror comprises a mirror housing and an accelerometer. The mirror housing is configured to be mounted within a vehicle. The accelerometer is disposed within the mirror housing for use in providing information as to an acceleration of the vehicle.

In accordance with another example, a telematics system for a vehicle is provided. The telematics system comprises a diagnostics device, a mirror, and a controller. The diagnostics device is configured to provide diagnostics information pertaining to the vehicle. The mirror is coupled to the diagnostics device, and comprises a mirror housing and an accelerometer. The mirror housing is configured to be mounted within a vehicle. The accelerometer is disposed within the mirror housing, and is configured to measure an acceleration of the vehicle. The controller is coupled to the diagnostics device and the accelerometer. The controller is configured to receive the diagnostics information and the acceleration, and to generate vehicle determinations using the diagnostics information and the acceleration.

In accordance with a further example, a telematics system for a vehicle is provided. The telematics unit system comprises a navigation device, a mirror, and a controller. The navigation device is configured to provide navigation information as to a position of the vehicle. The mirror is coupled to the navigation device, and comprises a mirror housing and an accelerometer. The mirror housing is configured to be mounted within a vehicle. The accelerometer is disposed within the mirror housing, and is configured to measure an acceleration of the vehicle. The controller is coupled to the navigation device and the accelerometer. The controller is configured to receive the navigation information and the acceleration and to generate vehicle determinations using the navigation information and the acceleration.

BRIEF DESCRIPTION OF THE DRAWINGS

Certain examples of the present disclosure will hereinafter be described in conjunction with the following drawing figures, wherein like numerals denote like elements, and wherein:

FIG. 6 is a flowchart of a non-limiting example of a method for detecting a vehicle crash that can be used in connection with the communication system of FIG. 1 and the telematics system of FIG. 2.

DETAILED DESCRIPTION

The following detailed description is merely exemplary in nature, and is not intended to limit the disclosure or the application and uses thereof. Furthermore, there is no intention to be bound by any expressed or implied theory presented in the preceding technical field, background, or the following detailed description.

Figure 1:
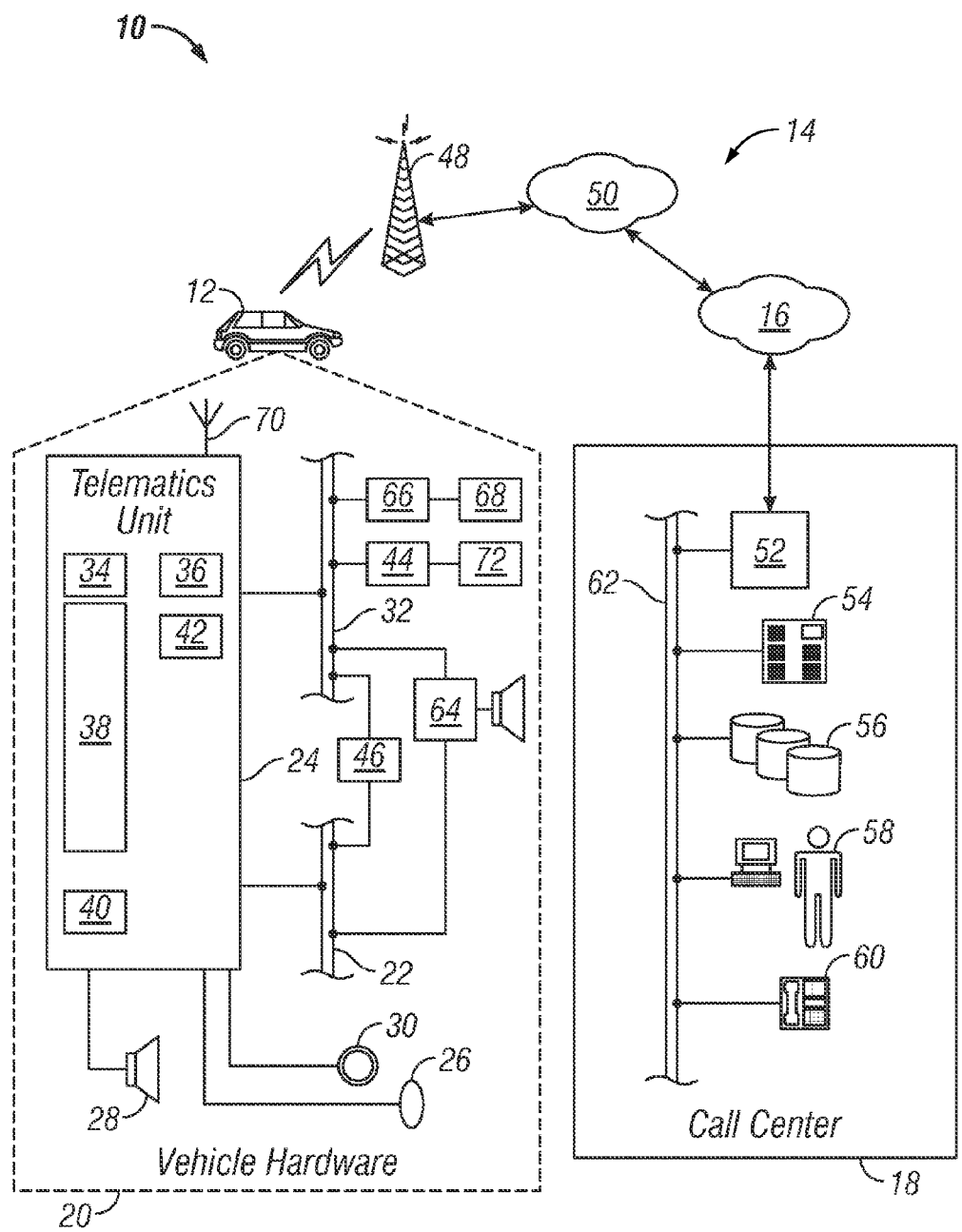
FIG. 1 is an exemplary schematic illustration of a non-limiting example of a communication system, including a telematics unit, for a vehicle.

With reference to FIG. 1, there is shown a non-limiting example of a communication system 10 that may be used together with examples of the systems disclosed herein. The communication system generally includes a vehicle 12, a wireless carrier system 14, a land network 16 and a call center 18. It should be appreciated that the overall architecture, setup and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, and the like, and is equipped with suitable hardware and software that enables it to communicate over communication system 10. Some of the vehicle hardware 20 is shown generally in FIG. 1 including a telematics unit 24, a microphone 26, a speaker 28, and buttons and/or controls 30 connected to the telematics unit 24. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communication with the call center 18, and generally includes an electronic processing device 38, one or more types of electronic memory 40, a cellular chipset/component 34, a wireless modem 36, a dual mode antenna 70, and a navigation unit containing a GPS chipset/component 42. In one example, the wireless modem 36 includes a computer program and/or set of software routines adapted to be executed within the electronic processing device 38.

The telematics unit 24 may provide various services including: turn-by-turn directions and other navigation-related services provided in conjunction with the GPS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above.

Figure 2:
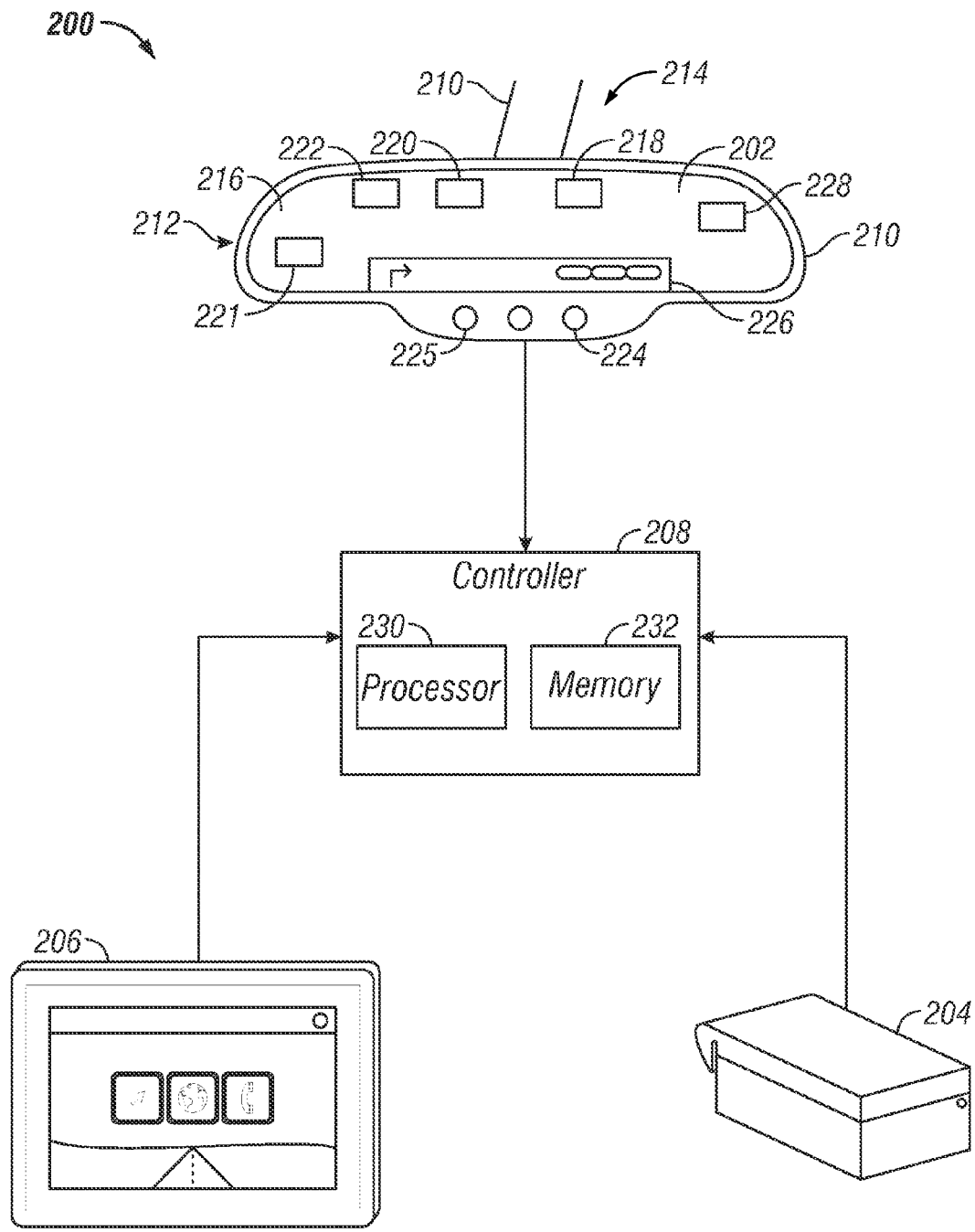
FIG. 2 is an exemplary schematic illustration of a non-limiting example of a telematics system comprising a mirror system, a diagnostics system, and a navigation system, and that can be used in connection with the communications system and the telematics unit of FIG. 1.
Figure 3:
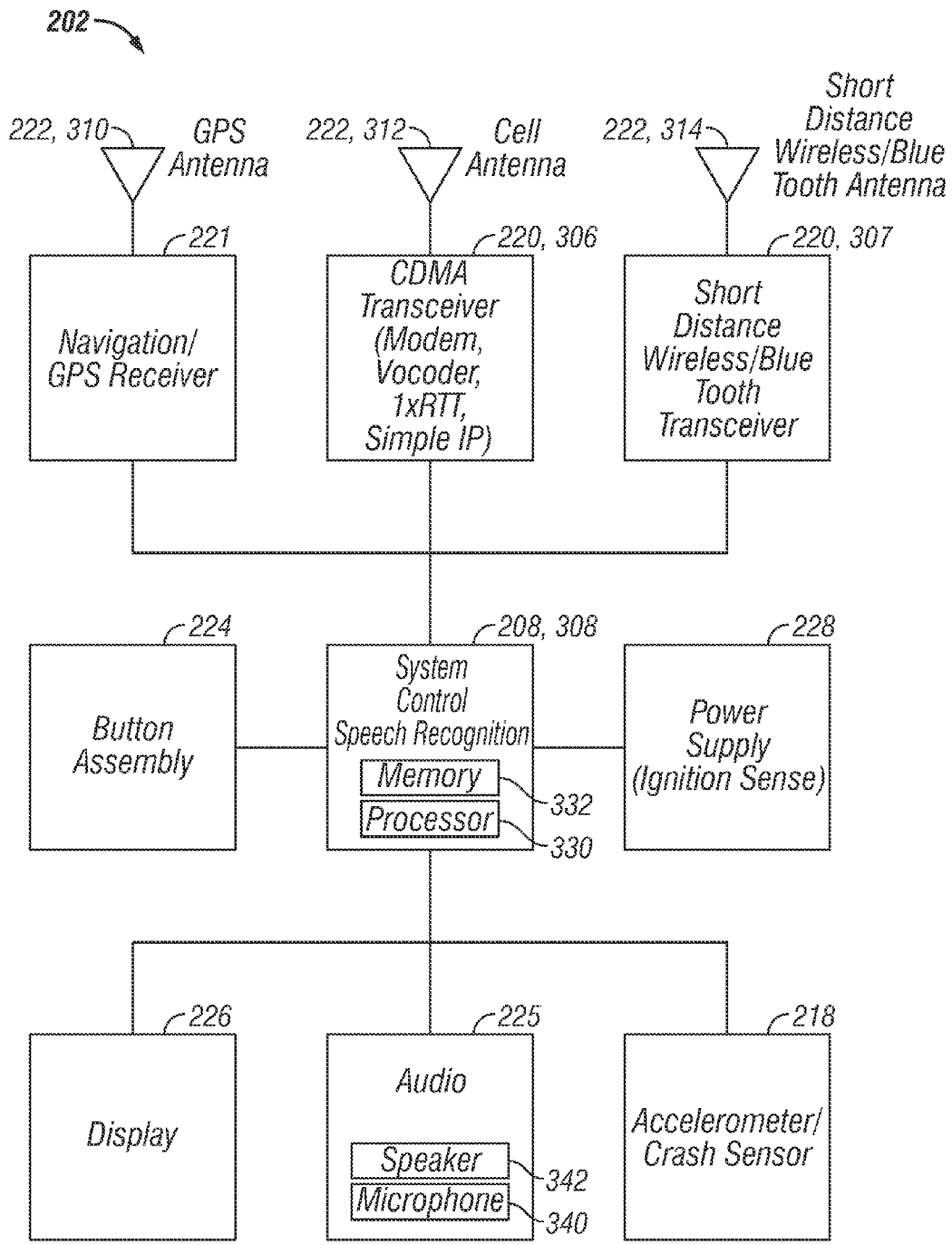
FIG. 3 is a functional block diagram of a non-limiting example of the mirror system of FIG. 2.
Figure 4:
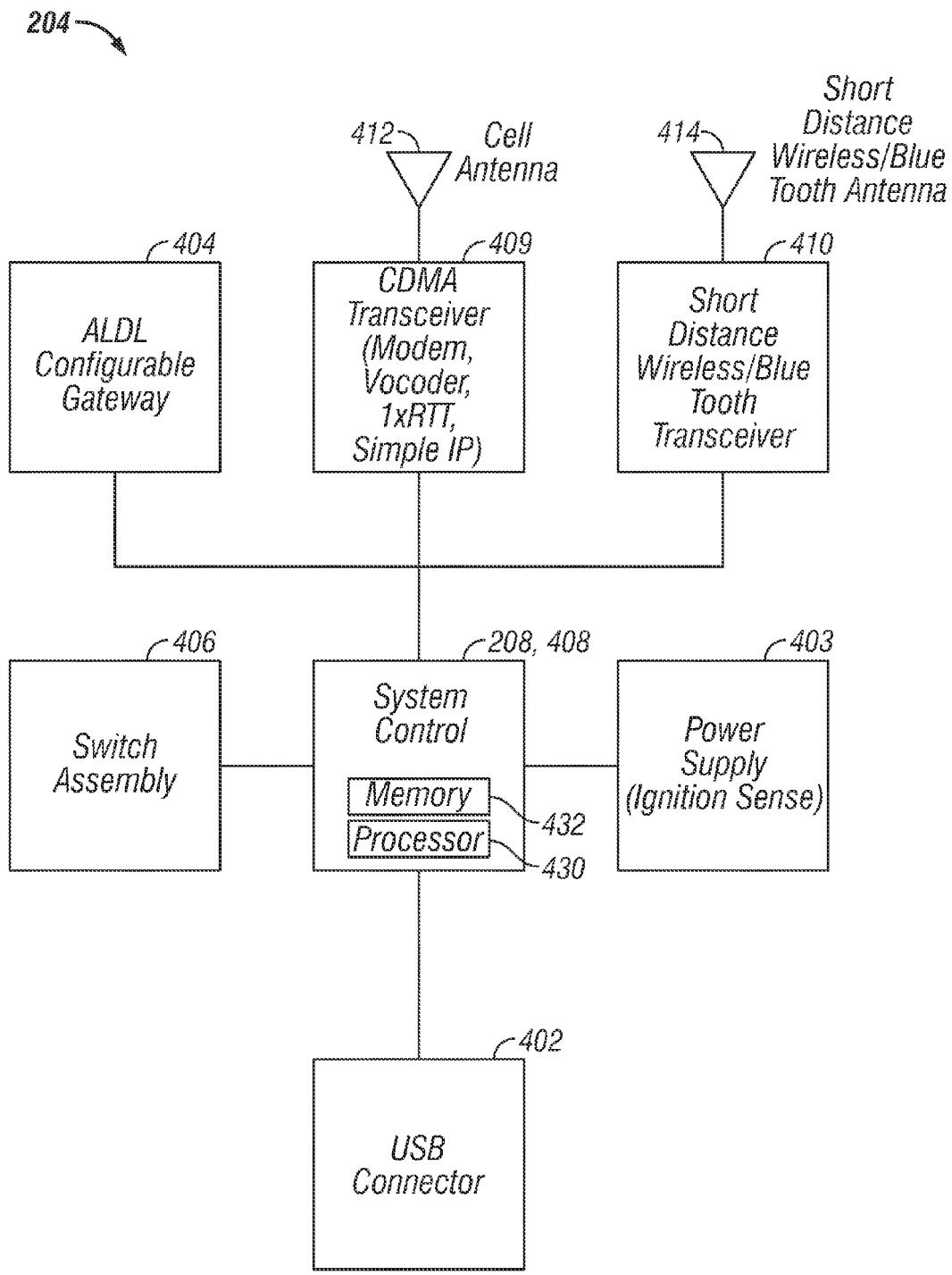
FIG. 4 is a functional block diagram of a non-limiting example of the diagnostics system of FIG. 2.
Figure 5:
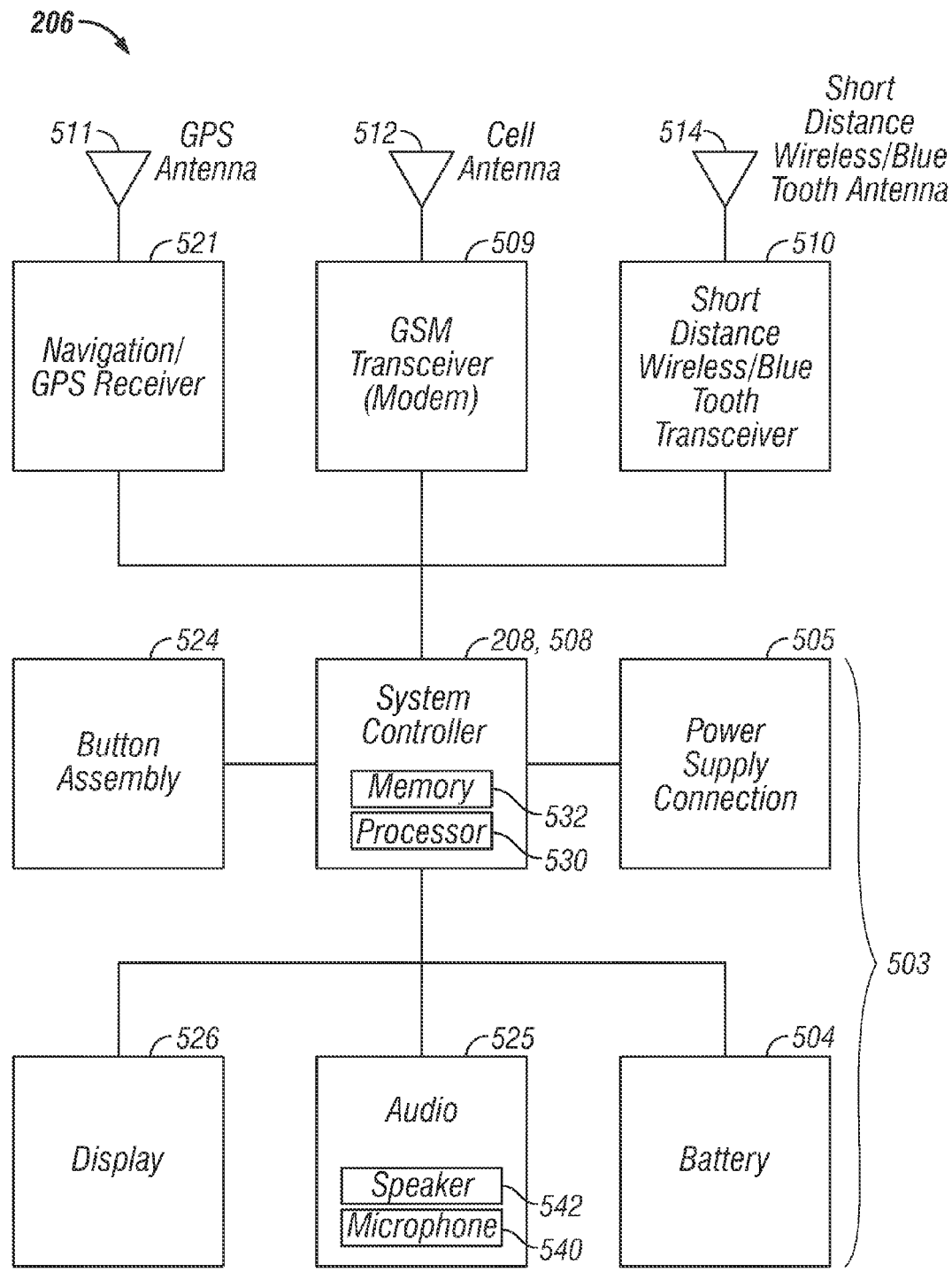
FIG. 5 is a functional block diagram of a non-limiting example of the navigation system of FIG. 2.

The telematics unit 24 comprises and/or is implemented in connection with a telematics system having a crash sensor and various other features disposed within a rear view mirror of the vehicle, for example as depicted in FIGS. 2 and 3 and described further below in connection therewith. In addition, the telematics unit 24 preferably comprises and/or is implemented in connection with other components of such a telematics system disposed within a diagnostic unit and/or a navigation unit, for example as depicted in FIGS. 2, 4, and 5 and described further below in connection therewith.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. In order to enable successful data transmission over the voice channel, wireless modem 36 applies some type of encoding or modulation to convert the digital data so that it can be communicated through a vocoder or speech codec incorporated in the cellular chipset/component 34. Any suitable encoding or modulation technique that provides an acceptable data rate and bit error can be used with the present examples. Dual mode antenna 70 services the GPS chipset/component 42 and the cellular chipset/component 34.

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32. Exemplary vehicle sensors include but are not limited to gyroscopes, accelerometers, magnetometers, emission detection, and/or control sensors, and the like. Exemplary sensor interface modules 44 include powertrain control, climate control, and body control, to name but a few.

Wireless carrier system 14 may be a cellular telephone system or any other suitable wireless system that transmits signals between the vehicle hardware 20 and land network 16. According to an example, wireless carrier system 14 includes one or more cell towers 48, base stations and/or mobile switching centers (MSCs) 50, as well as any other networking components required to connect the wireless carrier system 14 with land network 16. As appreciated by those skilled in the art, various cell tower/base station/MSC arrangements are possible and could be used with wireless carrier system 14. For example, a base station and a cell tower could be co-located at the same site or they could be remotely located, and a single base station could be coupled to various cell towers or various base stations could be coupled with a single MSC, to list but a few of the possible arrangements. A speech codec or vocoder may be incorporated in one or more of the base stations, but depending on the particular architecture of the wireless network, it could be incorporated within a Mobile Switching Center or some other network components as well.

Land network 16 can be a conventional land-based telecommunications network that is connected to one or more landline telephones, and that connects wireless carrier system 14 to call center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

Call center 18 is designed to provide the vehicle hardware 20 with a number of different system back-end functions and, according to the example shown here, generally includes one or more switches 52, servers 54, databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either the live advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a manned call center 18, it will be appreciated that the call center 18 can be any central or remote facility, manned or unmanned, mobile or fixed, to or from which it is desirable to exchange voice and data.

FIG. 2 is an exemplary schematic illustration of a non-limiting example of a telematics system 200 that can be used in connection with the communication system 10, the vehicle 12, and the telematics unit 24 of FIG. 1. In certain examples, the telematics system 200 comprises the telematics unit 24 of FIG. 1. In certain other examples, the telematics system 200 is coupled to or otherwise implemented in connection with the telematics unit 24 of FIG. 1.

As depicted in FIG. 2, the telematics system 200 comprises a mirror system 202, a diagnostics system 204, a navigation system 206, and a controller 208. The mirror system 202 obtains information as to an acceleration of the vehicle and whether there has been a vehicle crash, in addition to other information, such as inputs from a driver or other user or information from the vehicle environment including but not limited to sounds, chemical content, speed and heading information, and the like The diagnostics system 204 obtains diagnostics information pertaining to the vehicle, for example as to a maintenance record for the vehicle and data regarding usage and health of various vehicle systems and components (such as a vehicle engine system, a vehicle steering column, a vehicle braking system, vehicle tires, and a vehicle transmission system, among various other vehicle systems and components). In one example, the diagnostics system 204 comprises a dongle. The navigation system 206 obtains navigation information pertaining to the vehicle, for example as to a geographic position of the vehicle. In one example, the navigation system 206 comprises a global positioning system (GPS) device and/or one or more components thereof. Also in one example, the navigation system 206 provides such information to a navigation receiver 221 (preferably comprising a GPS receiver) of the mirror system 202 for use by the mirror system 220.

The mirror system 202 preferably comprises a rear-view mirror disposed inside a vehicle proximate a front dashboard of the vehicle for use by the driver. In the depicted example, the mirror system 202 includes, among other components, a mirror housing 210, a base section (or base) 212, a stem 214, an accelerometer (or crash sensor) 218, one or more transceivers 220, a navigation receiver 221, one or more antennas 222, a button assembly 224, an audio component 225, a display 226, and a power supply unit 228. The base 212 includes a reflective surface 216 formed on the housing in a direction facing toward the driver. The stem 214 is connected to the base 212, and is configured to be mounted inside the vehicle, preferably to a front window of the vehicle.

The accelerometer 218 is disposed within the mirror housing 210 of the base 212 at a location proximate to whether the base 212 contacts the stem 214. The accelerometer 218 measures an acceleration of the vehicle, for use in determining whether a vehicle crash or other event has occurred and can also be used to monitor driving characteristics such as hard braking, cornering, and the like. The accelerometer 218 may also be used to detect motion when the vehicle is not occupied to detect theft or a vehicle towing event. The controller 208 (and/or one or more other controllers of the telematics system 200) determines whether the vehicle has crashed based on the acceleration data provided by the accelerometer 218.

With reference to FIG. 6, an illustrative flowchart is provided for a method 600 used in connection with the mirror system 202 (including the accelerometer 218 thereof) of FIG. 2 in detecting a vehicle crash. The mirror system 202 is powered on and placed in an active state, if the mirror system 202 is not already powered on and in the active state (step 602).

If the accelerometer 218 detects motion, then a determination is made as to whether a vehicle acceleration measured by the accelerometer 218 is greater than a first predetermined threshold (step 604). The first predetermined threshold is preferably equal to a magnitude of vehicle acceleration that would indicate that a vehicle crash has likely occurred. The first predetermined threshold is preferably expressed in gravity (G) forces, with the amount of the G force varying on a particular vehicle's mass and/or other vehicle characteristics. If it is determined that the vehicle acceleration is less than or equal to the first predetermined threshold, the process returns to step 602, and steps 602 and 604 repeat until there is a determination in a subsequent iteration of step 604 that the vehicle acceleration is greater than the first predetermined threshold.

Once a determination is made in an iteration of step 604 that the vehicle is greater than the first predetermined threshold, a timer is started (step 606). Preferable the timer lasts for approximately ten to fifty milliseconds. A determination is then made as to whether the vehicle acceleration has been greater than the first predetermined threshold for the duration of the timer (step 608).

If it is determined that the vehicle acceleration has not been greater than the first predetermined threshold for the duration of the timer, the process returns to step 602, and steps 602-608 repeat until there is a subsequent determination in an iteration of step 608 that the vehicle acceleration has been greater than the first predetermined threshold for the duration of the timer.

Once a determination is made in an iteration of step 608 that the vehicle acceleration has been greater than the first predetermined threshold for the duration of the timer, a change in vehicle velocity is calculated from the accelerometer 218 over the duration of the timer (step 610). The vehicle velocity may be calculated from the vehicle acceleration values using any one of a number of different mathematical techniques, for example numerical integration and the like.

A determination is then made as to whether the change in vehicle velocity from step 610 is greater than a second predetermined threshold (step 612). The second predetermined threshold is preferably equal to a magnitude of vehicle velocity that would indicate that a vehicle crash has likely occurred. The second predetermined threshold preferably varies based on a particular vehicle's mass and/or other characteristics of the vehicle.

If it is determined that the change in vehicle velocity is less than or equal to the second predetermined threshold, the process returns to step 602, and steps 602-612 repeat until there is a determination in a subsequent iteration of step 612 that the change in vehicle velocity is greater than the second predetermined threshold. Once a determination is made in an iteration of step 612 that the change in vehicle velocity is greater than the second predetermined threshold, an emergency call is initiated to a call center (such as the call center 18 of FIG. 1), and/or other remedial actions are taken (step 614).

Returning to FIG. 2, the one or more transceivers 220 and antennas 222 are each disposed within the mirror housing 210. The one or more transceivers 220 transmit telematics information pertaining to the vehicle (for example, as to a vehicle acceleration and/or whether the vehicle has crashed) via the one or more antennas 222, for example along the wireless carrier system 14 and/or the land network 16 to the call center 18 of FIG. 1. For example, the one or more transceivers 220 transmit information pertaining to the vehicle acceleration from the accelerometer 218, information as to whether the vehicle has also crashed from the controller 208 (and/or from one or more other controllers of the telematics system 200), information provided by the driver or another user (for example, as obtained via the button assembly 224, the audio component 225, and/or one or more other interfaces), vehicle diagnostics information provided by the diagnostics system 204, and vehicle navigation information provided by the navigation system 206 to the navigation receiver 221. In certain examples, this information may be transmitted via one or more other transceivers of the telematics system 200, such as those depicted in FIGS. 3-5 and described further below in connection therewith. In addition, in certain examples, one or more antennas 222 may comprise and/or be coupled to the antenna 70 of FIG. 1 and/or components thereof, and/or may be implemented in connection with the wireless carrier system 14 and/or the land network 16 of FIG. 1. The antenna 70 can optionally be located remotely from the mirror housing.

The power supply unit 228 is also disposed within the mirror housing 210. The power supply unit 228 at least assists with providing or facilitating power for the mirror system 202. In one example, the power supply unit 228 comprises a battery. In another example, the power supply unit 228 comprises a connection to a power source of the vehicle, such as a vehicle battery.

The button assembly 224, the audio component 225, and the display 226 are each preferably disposed on or within the mirror housing 210 at the base 212 proximate the reflective surface 216, for convenient use by the driver. The button assembly 224 comprises a mechanical interface for the driver or another user to provide information or instructions to the telematics system 200, for example to control one or more components thereof, and/or to provide information or instructions outside the vehicle, for example to the call center 18 of FIG. 1. The button assembly 224 may comprise and/or be coupled to the buttons or controls 30 of FIG. 1 and/or components thereof.

The audio component 225 comprises an audio interface for the driver or another user to provide information or instructions to the telematics system 200 and/or outside the vehicle, for example to the call center 18 of FIG. 1, and for the driver or other users to receive audible information pertaining to the vehicle, such as an acceleration of the vehicle obtained via the accelerometer 218, diagnostics information obtained via the diagnostics system 204, navigation information as to a position or geographic location of the vehicle obtained via the navigation system 206, and determinations from the controller 208 (and/or one or more other controllers of the telematics system 200), for example as to whether a vehicle crash occurred or is imminent. The audio component 225 includes a microphone 340 (such as the microphone 26 of FIG. 1) configured to receive audio input from a user of the vehicle for processing by the controller 308, along with a speaker 342 (such as the speaker 28 of FIG. 1) to provide the audible information to the user. The audio component 225 may comprise and/or be coupled to the audio bus 22, the microphone 26, the speaker 28, and/or the vehicle audio component 64 of FIG. 1 and/or components thereof.

The display 226 displays visible information for the driver or other users, such as an acceleration of the vehicle obtained via the accelerometer 218, diagnostics information obtained via the diagnostics system 204, navigation information as to a position or geographic location of the vehicle obtained via the navigation system 206, and determinations from the controller 208 (and/or one or more other controllers of the telematics system 200), for example as to whether a vehicle crash occurred or is imminent.

The controller 208 preferably comprises a processor 230 and a memory 232. The processor 230 performs the steps and controls the overall functioning of the controller 208. The memory 232 is coupled to the processor 230, and stores information (such as vehicle acceleration data, user inputs, vehicle navigation data, and vehicle diagnostics data) for use by the processor 230 in executing such steps and generating vehicle determinations (such as to whether the vehicle has crashed, by way of example only). In one example, the processor 230 comprises and/or is coupled to the electronic processing device 38 of FIG. 1 and/or components thereof, and the memory 232 comprises and/or is coupled to the electronic memory 40 of FIG. 1 and/or components thereof.

The controller 208 processes the information provided by the mirror system 202, the diagnostics system 204, and the navigation system 206, and makes various vehicle determinations using this information. For example, as noted above, the controller 208 determines whether the vehicle has crashed based at least in part on the vehicle acceleration information obtained from the accelerometer 218 of the mirror system 202. The controller 208 also preferably controls communications via the transceiver 220 (and/or various other transmitters and/or receivers of the telematics system 200), and generally controls the functioning of the various components of the telematics system 200.

In one example, the controller 208 is coupled to each of the mirror system 202, the diagnostics system 204, and the navigation system 206, and controls the operations thereof. In certain other examples, the controller 208 may be disposed within and/or may be a component of one or more of the mirror system 202, the diagnostics system 204, and the navigation system 206. In addition, in certain examples, the mirror system 202, the diagnostics system 204, and the navigation system 206 may each comprise separate controllers 208, instead of or in addition to the central controller 208 depicted in FIG. 2.

FIGS. 3-5 depict functional block diagrams of non-limiting examples of the mirror system 202, the diagnostics system 204, and the navigation system 206 of FIG. 2. Turning first to FIG. 3, a functional block diagram of an exemplary mirror system 202 of FIG. 2 is provided. In the example of FIG. 3, the mirror system 202 includes a controller 308 disposed within the mirror housing 210 along with the other components of the mirror system 202 referenced above in connection with FIG. 2. The controller 308 controls the operation of the mirror system 202. The controller 308 preferably includes speech recognition capabilities.

The controller 308 preferably comprises a processor 330 and a memory 332. The processor 330 performs the steps and controls the overall functioning of the controller 308. The memory 332 is coupled to the processor 330, and stores information (such as vehicle acceleration data, user inputs, vehicle navigation data, and vehicle diagnostics data) for use by the processor 330 in executing such steps and generating vehicle determinations (such as to whether the vehicle has crashed, by way of example only). In one example, the processor 330 comprises and/or is coupled to the electronic processing device 38 of FIG. 1 and/or components thereof, and the memory 332 comprises and/or is coupled to the electronic memory 40 of FIG. 1 and/or components thereof.

In one example, the controller 308 comprises the controller 208 of FIG. 2 in its entirety, and performs all of the functions of the controller 208 described above. In certain other examples, the controller 308 of FIG. 3 coordinates and controls the functioning of the various components of the mirror system 202, and is coupled to one or more other controllers 208 of the telematics system 200 to provide other functions of the controller 208. By way of example, the controller 308 of FIG. 3 preferably processes the acceleration information from the accelerometer 218 and determines, therefrom, whether the vehicle has crashed, and coordinates appropriate transmission of information pertaining thereto (in addition to other vehicle information, such as the types of information described above in connection with FIG. 2), via one or more transceivers 220 and antennas 222.

Also in the example of FIG. 3, the mirror system 202 includes multiple transceivers 220 and antennas 222. Specifically, the mirror system 202 includes a cellular transceiver 306 and a short distance wireless transceiver 307. The cellular transceiver 306 preferably comprises a wireless cellular telephone receiver, such as a CDMA transceiver, and transmits and receives information between the vehicle and an outside source (such as the call center 18 of FIG. 1) via a cellular antenna 312. The short distance wireless transceiver 307 preferably comprises a wireless transceiver for use with short distance wireless communication systems, such as those used in connection with the trademark "Bluetooth", and transmits and receives information between the vehicle and an outside source (such as the call center 18 of FIG. 1) via a short distance wireless antenna 314. Also in the example of FIG. 3, the navigation receiver 221 comprises a GPS receiver, and receives navigation information as to a position or geographic location of the vehicle from the navigation system 206 of FIG. 2 via a navigation antenna 310 (preferably, a GPS antenna) disposed within the mirror housing 210.

It will be appreciated that in certain examples that the type and/or number of transceivers and/or receivers may vary. It will also be appreciated that one or more of the transceivers 220 may comprise a transmitter without receiving capabilities in certain examples, and/or may comprise separate transmitters and receivers, among other possible variations. Similarly, one or more dual mode antennas, such as the dual mode antenna 70 of FIG. 1, may be utilized.

With reference to FIG. 4, a functional block diagram of a non-limiting example of the diagnostics system 204 of FIG. 2 is provided. As depicted in FIG. 4, the diagnostics system 204 includes a connector 402, a power supply unit 403, a configurable gateway 404, a switch assembly 406, a controller 408, a cellular transceiver 409, a short distance wireless transceiver 410, a cellular antenna 412, and a short distance wireless antenna 414.

The connector 402 provides an interface for connecting the diagnostics system 204 (preferably comprising a dongle) to the mirror system 202 of FIGS. 2 and 3. The connector 402 preferably comprises a universal serial bus (USB) connector. The power supply unit 403 is disposed within a housing of the diagnostics system 204, and at least assists with providing or facilitating power for the diagnostics system 204. In one example, the power supply unit 403 comprises a battery. In another example, the power supply unit 403 comprises a connection to a power source of the vehicle, such as a vehicle battery.

The configurable gateway 404 provides a gateway for information transmission between the diagnostics system 204 and the vehicle. In one example, the configurable gateway 404 comprises an assembly line diagnostics link (ALDL) gateway that obtains vehicle diagnostics information from the vehicle via a vehicle communications bus, such as the vehicle bus 32 of FIG. 1. The vehicle diagnostics information preferably includes data regarding usage and health of various vehicle systems and components (such as a vehicle engine system, a vehicle steering column, a vehicle braking system, vehicle tires, and a vehicle transmission system, among various other vehicle systems and components). The switch assembly 406 is preferably controlled by the controller 408 in powering the diagnostics system 204 on and off, and/or between a live mode and a sleeping mode, and the like.

The controller 408 is disposed within the diagnostics system housing. The controller 408 controls the operation of the diagnostics system 204. The controller 408 preferably comprises a processor 430 and a memory 432. The processor 430 performs the steps and controls the overall functioning of the controller 408. The memory 432 is coupled to the processor 430, and stores information (such as vehicle diagnostics data) for use by the processor 430 in executing such steps and generating vehicle determinations (such as to health or usage information as to various vehicle systems or components, by way of example only). In one example, the processor 430 comprises and/or is coupled to the electronic processing device 38 of FIG. 1 and/or components thereof, and the memory 432 comprises and/or is coupled to the electronic memory 40 of FIG. 1 and/or components thereof.

In one example, the controller 408 comprises the controller 208 of FIG. 2 in its entirety, and performs all of the functions of the controller 208 described above. In certain other examples, the controller 408 of FIG. 4 coordinates and controls the functioning of the various components of the diagnostics system 204, and is coupled to one or more other controllers 208 of the telematics system 200 to perform other functions of the controller 208. By way of example, the controller 408 of FIG. 4 preferably processes the vehicle diagnostics information and makes various vehicle determinations (such as determinations assessing the health, operation, and/or functioning of various vehicle systems and components) using the diagnostics information.

The vehicle determinations are transmitted via one or more of the transceivers 409, 410 using one or more of the antennas 412, 414. The cellular transceiver 409 preferably comprises a wireless cellular telephone receiver, such as a CDMA transceiver, and transmits and receives information between the vehicle and an outside source (such as the call center 18 of FIG. 1) via the cellular antenna 412. The short distance wireless transceiver 410 preferably comprises a wireless transceiver for use with short distance wireless communication systems, such as those used in connection with the trademark "Bluetooth", and transmits and receives information between the vehicle and another component within the vehicle via the short distance wireless antenna 414, such as a portable phone, media player, or diagnostic dongle. It will be appreciated that in certain examples that the type and/or number of transceivers and/or receivers may vary.

In certain examples, one or more of the transceivers 409, 410 comprise the one or more transceivers 220 of FIG. 2 and/or perform functions thereof, and the antennas 412, 414 comprise the one or more antennas 222 of FIG. 2 and/or perform the functions thereof. It will also be appreciated that one or more of the transceivers of FIG. 4 may comprise a transmitter without receiving capabilities in certain examples, and/or may comprise separate transmitters and receivers, among other possible variations.

With reference to FIG. 5, a functional block diagram of a non-limiting example of the navigation system 206 of FIG. 2 is provided. As depicted in FIG. 3, the navigation system 206 includes a power supply unit 503, a controller 508, a cellular transceiver 509, a short distance wireless transceiver 510, a cellular antenna 512, a short distance wireless antenna 514, a navigation receiver 521, a navigation antenna 511, a button assembly 524, an audio component 525, and a display 526. The power supply unit 503 is disposed within a housing of the navigation system 206, and at least assists with providing or facilitating power for the navigation system 206. In one example, the power supply unit 503 comprises a battery 504 and a power supply connection 505 configured to be connected to a power source of the vehicle, such as a vehicle battery.

The controller 508 is disposed within the navigation system housing. The controller 508 controls the operation of the navigation system 206. The controller 508 preferably includes speech recognition capabilities.

The controller 508 preferably comprises a processor 530 and a memory 532. The processor 530 performs the steps and controls the overall functioning of the controller 508. The memory 532 is coupled to the processor 530, and stores information (such as vehicle navigation data) for use by the processor 530 in executing such steps and generating vehicle determinations (such as to a location or path of the vehicle). In one example, the processor 530 comprises and/or is coupled to the electronic processing device 38 of FIG. 1 and/or components thereof, and the memory 532 comprises and/or is coupled to the electronic memory 40 of FIG. 1 and/or components thereof.

In one example, the controller 508 comprises the controller 208 of FIG. 2 in its entirety, and performs all of the functions of the controller 208 described above. In certain other examples, the controller 508 of FIG. 5 coordinates and controls the functioning of the various components of the navigation system 206, and is coupled to one or more other controllers of the telematics system 200 to provide other functions of the controller 208. By way of example, the controller 508 of FIG. 5 preferably processes the vehicle navigation information and makes various vehicle determinations (such as determinations assessing the health of various vehicle systems and components) using the navigation information.

The vehicle determinations are transmitted via one or more of the transceivers 509, 510 using one or more of the antennas 512, 514. The cellular transceiver 509 preferably comprises a wireless cellular telephone receiver, such as a CDMA transceiver, and transmits and receives information between the vehicle and an outside source (such as the call center 18 of FIG. 1) via the cellular antenna 512. The short distance wireless transceiver 510 preferably comprises a wireless transceiver for use with short distance wireless communication systems, such as those used in connection with the trademark "Bluetooth", and transmits and receives information between the vehicle and an outside source (such as the call center 18 of FIG. 1) via the short distance wireless antenna 514. It will be appreciated that in certain examples that the type and/or number of transceivers and/or receivers may vary. Also in the example of FIG. 5, the navigation receiver 521 comprises a GPS receiver, and receives information as to a position or geographic location of the vehicle from a remote GPS system or device via the GPS antenna 511.

In certain examples, one or more of the transceivers 509, 510 comprise the one or more transceivers 220 of FIG. 2 and/or perform functions thereof, and the antennas 512, 514 comprise the one or more antennas 222 of FIG. 2 and/or perform the functions thereof. It will be appreciated that in certain examples that the type and/or number of transceivers and/or receivers may vary. It will also be appreciated that one or more of the transceivers of FIG. 5 may comprise a transmitter without receiving capabilities in certain examples, and/or may comprise separate transmitters and receivers, among other possible variations.

The button assembly 524, the audio component 525, and the display 526 are each preferably disposed on or within the navigation system housing. The button assembly 524 comprises a mechanical interface for the driver or another user to provide information or instructions to the telematics system 200, for example to control one or more components thereof, and/or to provide information or instructions outside the vehicle, for example to the call center 18 of FIG. 1. The button assembly 524 may comprise and/or be coupled to the buttons or controls 30 of FIG. 1 and/or components thereof.

The audio component 525 comprises an audio interface for the driver or another user to provide information or instructions to the telematics system 200 and/or outside the vehicle, for example to the call center 18 of FIG. 1, and for the driver or other users to receive audible information pertaining to the vehicle, such as a position or location of the vehicle, and/or determinations from the controller 508 (and/or one or more other controllers of the telematics system 200). The audio component 525 includes a microphone 540 configured to receive audio input from a user of the vehicle for processing by the controller 508, along with a speaker 542 to provide the audible information to the user. The audio component 525 may comprise and/or be coupled to the audio bus 22, the microphone 26, the speaker 28, and/or the vehicle audio component 64 of FIG. 1 and/or components thereof.

The display 526 displays visible information for the driver or other users, such as those pertaining to a position or location of the vehicle and/or navigation-related information, and/or determinations from the controller 508 (and/or one or more other controllers of the telematics system 200). In certain examples, the display 526 could also be a "ghosted" display that would appear only when active from behind the reflective surface (e.g., similar to the mirrors with backup cameras). Such a display 526 could present text or other information/graphics that could be of value to the driver (e.g., a left turn arrow and the name of a street as part of the navigation service).

Accordingly, improved mirror systems and telematics systems for vehicles are provided. A disclosed mirror system includes a mirror housing, an accelerometer disposed within the mirror housing, a controller, a transceiver, and a controller. The mirror system provides information, for example as to a whether a vehicle crash has occurred. Such information is transmitted, for example, to a call center. A disclosed telematics system includes such a mirror system. In addition, in certain examples, a disclosed telematics system also includes a diagnostics system for providing diagnostics information for the vehicle and a navigation system for providing navigation information (such as a position of the vehicle). The disclosed window systems and telematics systems allow for improved implementation of telematics units for vehicles, for example in providing movable telematics units for vehicles, such as for vehicles that do not already have a built-in telematics unit and/or for when a user purchases a new vehicle, among other possible implementations.

It will be appreciated that the disclosed systems and components thereof may differ from those depicted in the figures and/or described above. For example, the communication system 10, the telematics unit 24, and/or various parts and/or components thereof may differ from those of FIG. 1 and/or described above. Similarly, the mirror system 202, the diagnostics system 204, the navigation system 206, and/or various parts and/or components thereof may differ from those of FIGS. 3-5 and/or described above.

Similarly, it will similarly be appreciated that, while the disclosed systems are described above as being used in connection with automobiles such as sedans, trucks, vans, and sports utility vehicles, the disclosed systems may also be used in connection with any number of different types of vehicles, and in connection with any number of different systems thereof and environments pertaining thereto.

While at least one example has been presented in the foregoing detailed description, it should be appreciated that a vast number of variations exist. It should also be appreciated that the detailed description represents only examples, and is not intended to limit the scope, applicability, or configuration of the invention in any way. Rather, the foregoing detailed description will provide those skilled in the art with a convenient road map for implementing the examples. It should be understood that various changes can be made in the function and arrangement of elements without departing from the scope of the invention as set forth in the appended claims and the legal equivalents thereof.

What is claimed is:

1. A telematics system comprising:
a mirror housing configured to be mounted within a vehicle;
an accelerometer disposed within the mirror housing for use in providing information as to an acceleration of the vehicle;
a controller disposed within the mirror housing and coupled to the accelerometer, the controller configured to receive data from the accelerometer and to generate vehicle determinations or driver behavior based on the data;
a display coupled to the controller, the display configured to display information pertaining to the vehicle determinations; and
a receiver configured to receive navigation information as to a position of the vehicle and diagnostics information from a vehicle diagnostics unit;
wherein the display is further configured to display the navigation information and the diagnostics information.

2. The telematics system of claim 1, wherein:
the mirror housing comprises:
a base including a reflective surface; and
a stem attached to the base and configured to be attached to the vehicle;
wherein the accelerometer is disposed in a region of the base proximate to the stem.

3. The telematics system of claim 1, further comprising:
a transmitter disposed within the mirror housing and configured to transmit an indication or recorded history of an acceleration of the vehicle.

4. The telematics system of claim 3, further comprising:
an antenna disposed within the mirror housing;
wherein the transmitter is configured to transmit the record of the acceleration of the vehicle via the antenna.

5. The telematics system of claim 1, wherein the vehicle determinations include a determination as to whether a vehicle crash has occurred based on:
a first comparison of the acceleration of the vehicle with a first predetermined threshold; and
a second comparison of a velocity of the vehicle with a second predetermined threshold.

6. The telematics system of claim 5, wherein the controller determines whether the vehicle crash has occurred based on:
a first comparison of the acceleration of the vehicle with a first predetermined threshold; and
a second comparison of a velocity of the vehicle with a second predetermined threshold.

7. A telematics system for a vehicle, the telematics system comprising:
a diagnostics device configured to provide diagnostics information pertaining to the vehicle;
a mirror coupled to the diagnostics device, the mirror comprising:
a mirror housing configured to be mounted within the vehicle; and
an accelerometer disposed within the mirror housing and configured to measure an acceleration of the vehicle; and
a controller coupled to the diagnostics device and the accelerometer and configured to receive the diagnostics information and the acceleration and to generate vehicle determinations using the diagnostics information and the acceleration.

8. The telematics system of claim 7, further comprising:
A transmitter coupled to the controller and configured to transmit determination information pertaining to the vehicle determinations.

9. The telematics system of claim 8, further comprising:
an antenna;
wherein the transmitter is configured to transmit the determination information via the antenna.

10. The telematics system of claim 7, wherein the controller determines whether a vehicle crash has occurred based on:
a first comparison of the acceleration of the vehicle with a first predetermined threshold; and
a second comparison of a velocity of the vehicle with a second predetermined threshold.

11. The telematics system of claim 7, wherein the mirror housing comprises:
a base including a reflective surface; and
a stem attached to the base and configured to be attached to the vehicle;
wherein the accelerometer is disposed in a region of the base proximate to the stem.

12. A telematics system for a vehicle, the telematics system comprising:
- a navigation device configured to provide navigation information as to a position of the vehicle;
- a mirror coupled to the navigation device, the mirror comprising:
  - a mirror housing configured to be mounted within the vehicle; and
  - an accelerometer disposed within the mirror housing and configured to measure an acceleration of the vehicle; and
- a controller coupled to the navigation device and the accelerometer and configured to receive the navigation information and the acceleration and to generate vehicle determinations using the navigation information and the acceleration.

13. The telematics system of claim 12, further comprising:
a transmitter coupled to the controller and configured to transmit determination information pertaining to the vehicle determinations.

14. The telematics system of claim 13, further comprising:
an antenna;
wherein the transmitter is configured to transmit the determination information via the antenna.

15. The telematics system of claim 12, further comprising:
- a diagnostics device configured to provide diagnostics information pertaining to the vehicle;
- wherein the controller is further coupled to the diagnostics device and is further configured to receive the diagnostics information and to generate the vehicle determinations using the diagnostics information, the navigation information, and the acceleration.

16. The telematics system of claim 12, wherein the controller determines whether a vehicle crash has occurred based on:
- a first comparison of the acceleration of the vehicle with a first predetermined threshold; and
- a second comparison of a velocity of the vehicle with a second predetermined threshold.

17. The telematics system of claim 12, wherein the mirror housing comprises:
- a base including a reflective surface; and
- a stem attached to the base and configured to be attached to the vehicle;
- wherein the accelerometer is disposed in a region of the base proximate to the stem.

* * * * *